Feb. 18, 1941.  A. WETSCH  2,232,578
EGG CARRIER
Filed July 11, 1939  2 Sheets-Sheet 1
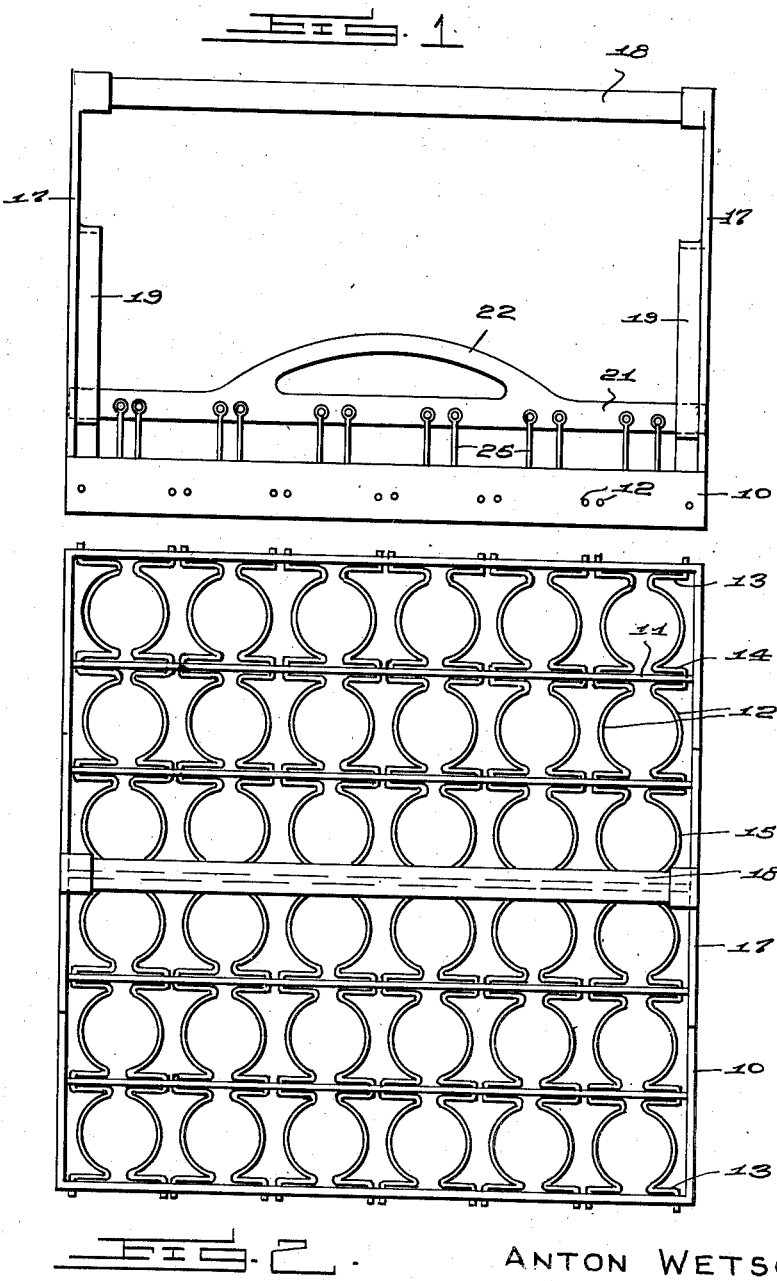
Inventor
ANTON WETSCH,
By Clarence A. O'Brien
and Hyman Berman
Attorneys

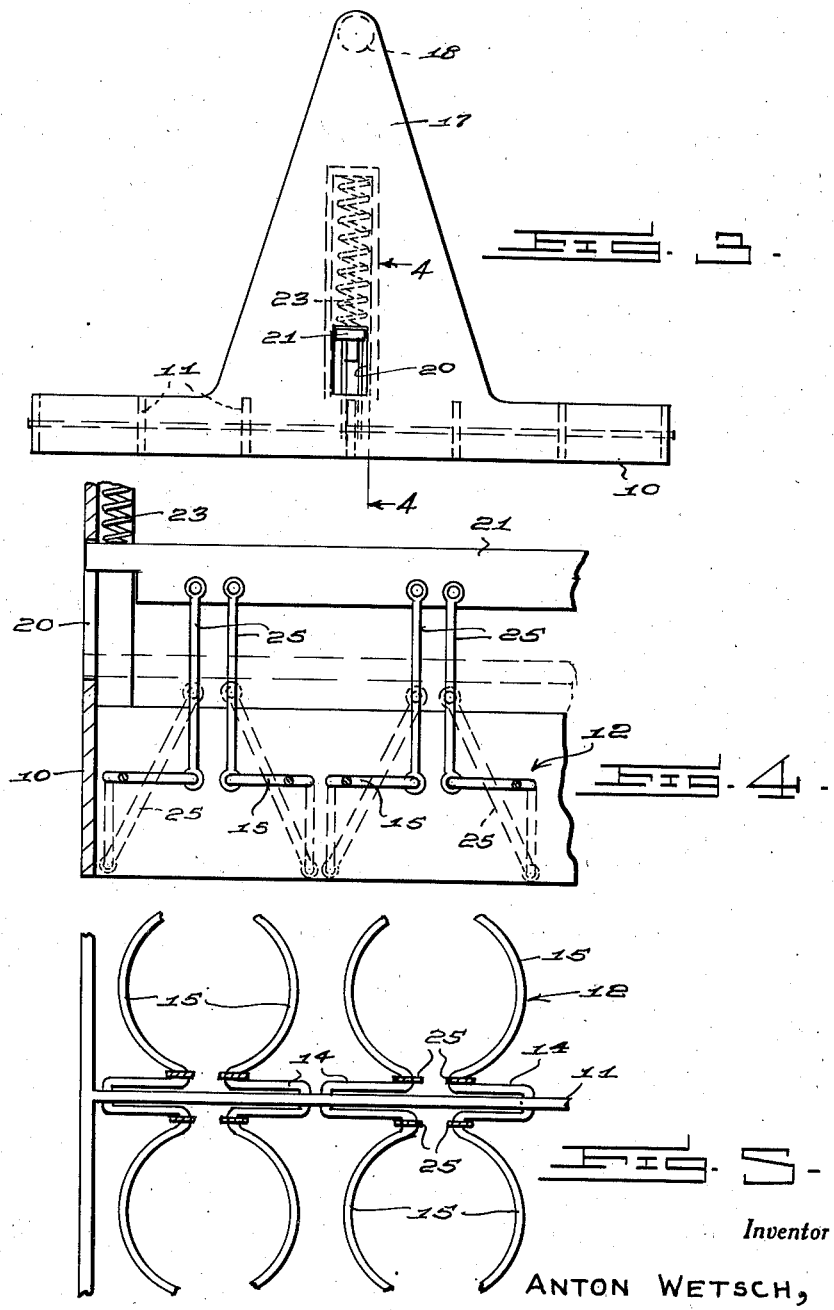

Patented Feb. 18, 1941

2,232,578

UNITED STATES PATENT OFFICE 2,232,578

EGG CARRIER

Anton Wetsch, Killdeer, N. Dak.

Application July 11, 1939, Serial No. 283,897

1 Claim. (Cl. 294—87)

This invention relates to an egg carrier, the general object of the invention being to provide a frame having a plurality of wires supported for rocking movement therein, and said wires being bent to form egg engaging parts with manually operated means for moving the wires into position for holding eggs or for releasing eggs.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is an elevation of the carrier.

Figure 2 is a top plan view of the carrier.

Figure 3 is an end view of the carrier.

Figure 4 is a fragmentary sectional view taken approximately on the line 4—4 of Figure 3.

Figure 5 is a fragmentary plan view with parts in section showing the egg holding loops and the operating means therefor.

The carrier includes a rectangular frame 10 formed of flat bar-like stock set on edge and said frame contains a plurality of spaced partitions 11 which are also formed of flat stock set on edge. The eggs holding and engaging members are composed of a plurality of wires 12. Each wire has each end bent into L-shape as shown at 13 with the free arm of the L short and passing through a hole in each member of the frame 10 which parallels the partitions 11, and each wire is also formed with a plurality of substantially U-shaped parts 14, the bight of each of which passes through a hole in a partition 11 and between these U-shaped portions and the L-shaped portions the wire is bent into substantially semi-circular shape as shown at 15. The short arms of the part 13 and the bights of the U-shaped parts 14 form trunnions which are rotatably arranged in the holes in the partitions 11 and the end parts of the frame 10 which parallel the partitions so that the members 15 can be swung about horizontal axes. As clearly shown in Figure 4 the wires are arranged in pairs with the bowed parts 15 of the two wires extending in opposite direction so as to form substantially circular openings for receiving the eggs.

Upright parts 17 extend upwardly from the central portions of the side members of the frame 10 and have their upper ends connected together by a handle forming bar 18. The inner faces of these members 17 are formed with the elongated housings 19 and at the lower portions of these housings said members 17 are formed with the slots 20 which form guideways for a bar 21 having its ends engaging said guideways, the bar being provided with the handle 21 and said bar is adapted to be normally held with its ends engaging the lower end walls of the slots 20 by the springs 23 in the housings 19. Pairs of links 25 have their upper ends pivotally connected with the bar 21 and depend therefrom and have their lower ends connected with the wires 12 at the central portions of said wires and where the central U-shaped parts 14 connect with the bowed portions as shown more particularly in Figure 5.

Thus when the bar 21 is in its lowermost position and is held there by the springs 23 the links will move the wire members 12 into substantially vertical position so that the carrier can be placed over a group of eggs in a case after the filler has been removed from the case and the eggs are standing upright on the flat below the filler. Then by moving the bar 21 upwardly by a grip on the handle 22 the links 25 will be caused to swing the wires 12 into substantially horizontal position so that the eggs will be gripped and supported by the wires so that the eggs can be lifted from the case by the carrier and taken to a testing device or from a testing device to another case or the device can be used wherever it is desired to move a group of eggs or other objects from one place to another.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

An egg carrier comprising a rectangular frame including side bars and partitions between said bars laterally spaced and extending parallel therewith, a handle upstanding from said frame and including a pair of vertical uprights, egg gripping rods in said frame extending across the same from side to side thereof and arranged in opposed complemental pairs, the rods of said pairs having substantially semicircular egg gripping portions intermediate said sides and partitions and being provided with end cranks journaled in said sides, and intermediate cranks journaled in and straddling said partitions whereby said rods are rotatable in pairs in said sides and partitions to swing the gripping portons of said pairs into horizontal oppositely bowed egg-gripping relation in each pair or into vertical depending egg-releasing position in each pair, and means to rotate said rods comprising an operating bar extending horizontally between said uprights and having its ends vertically slidable therein, spring means tensioning said operating bar against upward movement from a normal position, and links connecting said operating bar to said rods for rotation of the latter under upward movement of said bar from normal position to swing the egg-gripping portions from vertical to horizontal position.

ANTON WETSCH.